United States Patent
Liu et al.

(10) Patent No.: US 12,446,112 B2
(45) Date of Patent: Oct. 14, 2025

(54) METHOD FOR IMPROVED EMERGENCY CALL

(71) Applicant: QUALCOMM Incorporated, San Diego, CA (US)

(72) Inventors: Guojing Liu, Beijing (CN); Dongsheng Wang, Beijing (CN); Chaofeng Hui, Beijing (CN); Fojian Zhang, Shenzhen (CN); Haibo Liu, Shanghai (CN); Xiaomeng Lu, Shanghai (CN); Xuesong Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 17/999,099

(22) PCT Filed: Jun. 30, 2020

(86) PCT No.: PCT/CN2020/099323
§ 371 (c)(1),
(2) Date: Nov. 17, 2022

(87) PCT Pub. No.: WO2022/000276
PCT Pub. Date: Jan. 6, 2022

(65) Prior Publication Data
US 2023/0217545 A1    Jul. 6, 2023

(51) Int. Cl.
*H04W 76/50* (2018.01)
*H04W 76/18* (2018.01)

(52) U.S. Cl.
CPC ........... *H04W 76/50* (2018.02); *H04W 76/18* (2018.02)

(58) Field of Classification Search
CPC ..................................................... H04W 76/50
(Continued)

(56) References Cited

U.S. PATENT DOCUMENTS

2012/0047262 A1* 2/2012 Laarakkers ........... H04W 12/06
709/225
2015/0056943 A1* 2/2015 Huang ................... H04W 4/90
455/552.1

(Continued)

FOREIGN PATENT DOCUMENTS

CN          104641717 A          5/2015
CN          106170125 A          11/2016
(Continued)

OTHER PUBLICATIONS

Supplementary European Search Report—EP20943794—Search Authority—Berlin—Feb. 2, 2024.
(Continued)

*Primary Examiner* — Maria El-Zoobi
(74) *Attorney, Agent, or Firm* — Paul M. McAdams; Patterson & Sheridan LLP

(57) ABSTRACT

Aspects of the present disclosure provide techniques for improving emergency calls by a user equipment (UE) in certain scenarios. The techniques generally include receiving a trigger for the UE to perform a circuit switched (CS) emergency call via a first subscriber identity module (SIM) that is serving as a default data subscriber (DDS), attempting the CS emergency call via the first SIM, detecting a failure to perform the CS emergency call via the first SIM, and re-attempting the CS emergency call via a second SIM, in response to the detection.

20 Claims, 6 Drawing Sheets

(58) Field of Classification Search
USPC .................................................. 455/404.1
See application file for complete search history.

(56) References Cited

U.S. PATENT DOCUMENTS

2016/0142998 A1    5/2016   Tsai et al.
2016/0345149 A1   11/2016   Chuttani et al.
2021/0235541 A1*   7/2021   Seol ..................... H04W 76/50

FOREIGN PATENT DOCUMENTS

| CN | 107040906 A | 8/2017 |
| CN | 110140369 A | 8/2019 |
| CN | 110933657 A | 3/2020 |
| WO | 2016149270 | 9/2016 |
| WO | 2017196744 A1 | 11/2017 |
| WO | 2019240524 A1 | 12/2019 |
| WO | 2020027461 A1 | 2/2020 |
| WO | 2021120940 A1 | 6/2021 |

OTHER PUBLICATIONS

International Search Report and Written Opinion—PCT/CN2020/099323—ISA/EPO—Mar. 26, 2021.

* cited by examiner

METHOD FOR IMPROVED EMERGENCY CALL

CROSS-REFERENCE TO RELATED APPLICATIONS

This application is a national stage application under 35 U.S.C. 371 of PCT/CN2020/099323 filed Jun. 30, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for improving overall system performance when making an emergency call in certain scenarios.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved performance of UEs operating with one or more SIMs.

Certain aspects provide a method for wireless communications by a user-equipment (UE). The method generally includes obtaining a trigger for the UE to perform a circuit switched (CS) emergency call via a first subscriber identity module (SIM) that is serving as a default data subscriber (DDS), attempting the CS emergency call via the first SIM, detecting a failure to perform the CS emergency call via the first SIM, and re-attempting the CS emergency call via a second SIM, in response to the detection.

Certain aspects provide an apparatus for wireless communications by a user-equipment (UE). The apparatus generally includes means for obtaining a trigger for the UE to perform a circuit switched (CS) emergency call via a first subscriber identity module (SIM) that is serving as a default data subscriber (DDS); means for attempting the CS emergency call via the first SIM; means for detecting a failure to perform the CS emergency call via the first SIM; and means for re-attempting the CS emergency call via a second SIM, in response to the detection.

Certain aspects provide an apparatus for wireless communications by a user-equipment (UE). The apparatus generally includes an interface configured to obtain a trigger for the UE to perform a circuit switched (CS) emergency call via a first subscriber identity module (SIM) that is serving as a default data subscriber (DDS); and a processing system configured to: attempt the CS emergency call via the first SIM; detect a failure to perform the CS emergency call via the first SIM; and re-attempt the CS emergency call via a second SIM, in response to the detection.

Certain aspects provide a user-equipment (UE). The UE generally includes a receiver configured to receive a trigger for the UE to perform a circuit switched (CS) emergency call via a first subscriber identity module (SIM) that is serving as a default data subscriber (DDS); and a processing system configured to: attempt the CS emergency call via the first SIM; detect a failure to perform the CS emergency call via the first SIM; and re-attempt the CS emergency call via a second SIM, in response to the detection.

Certain aspects provide a computer-readable medium for wireless communications by a user-equipment (UE). The computer-readable medium generally includes codes executable to obtain a trigger for the UE to perform a circuit switched (CS) emergency call via a first subscriber identity module (SIM) that is serving as a default data subscriber (DDS); attempt the CS emergency call via the first SIM; detect a failure to perform the CS emergency call via the first SIM; and re-attempt the CS emergency call via a second SIM, in response to the detection.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

Figure 1:
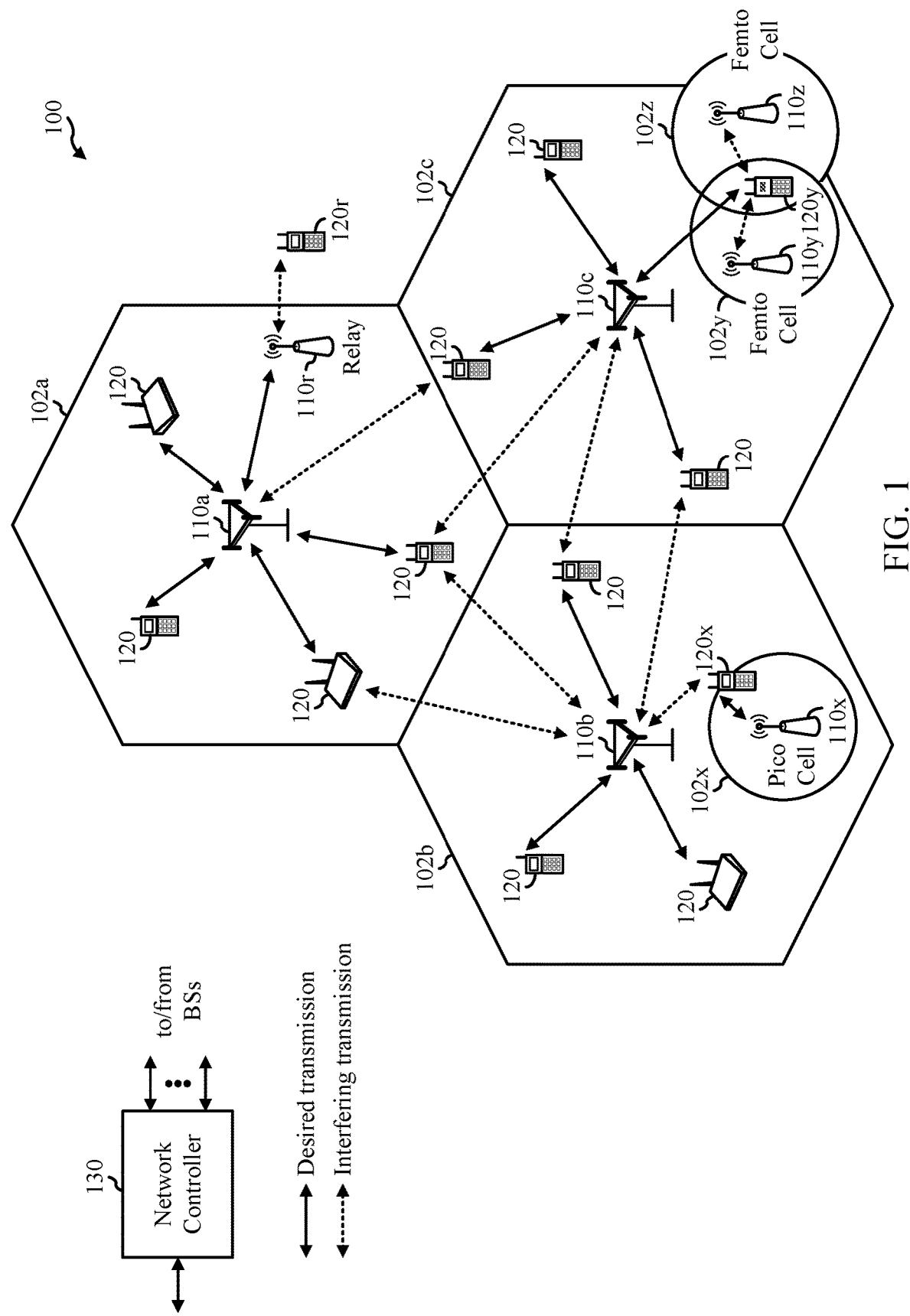
FIG. 1 is a block diagram conceptually illustrating an example telecommunications system, in accordance with certain aspects of the present disclosure.

The attached APPENDIX includes details of certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for mechanisms that may help improve overall system performance in dual subscriber identity module (dual SIM) scenarios. In some cases, if an emergency call attempt on a first SIM fails, the UE may re-attempt the emergency call on another SIM. This approach may allow the UE to avoid disabling capability when leaving a first radio access network (RAN) cell to fall back to attempt the emergency call. As a result, the UE may be able to return to the first RAN faster after the emergency call.

The following description provides examples of prioritizing activities on SIM(s) of a UE in a communication system, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, a UE 120a may support (or operate with) multiple SIMs and may have a SIM controller 122a configured perform (or assist UE 120a in performing) operations 500 of FIG. 5. As will be described in greater detail below, operations 500 may enhanced emergency call performance in certain scenarios.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
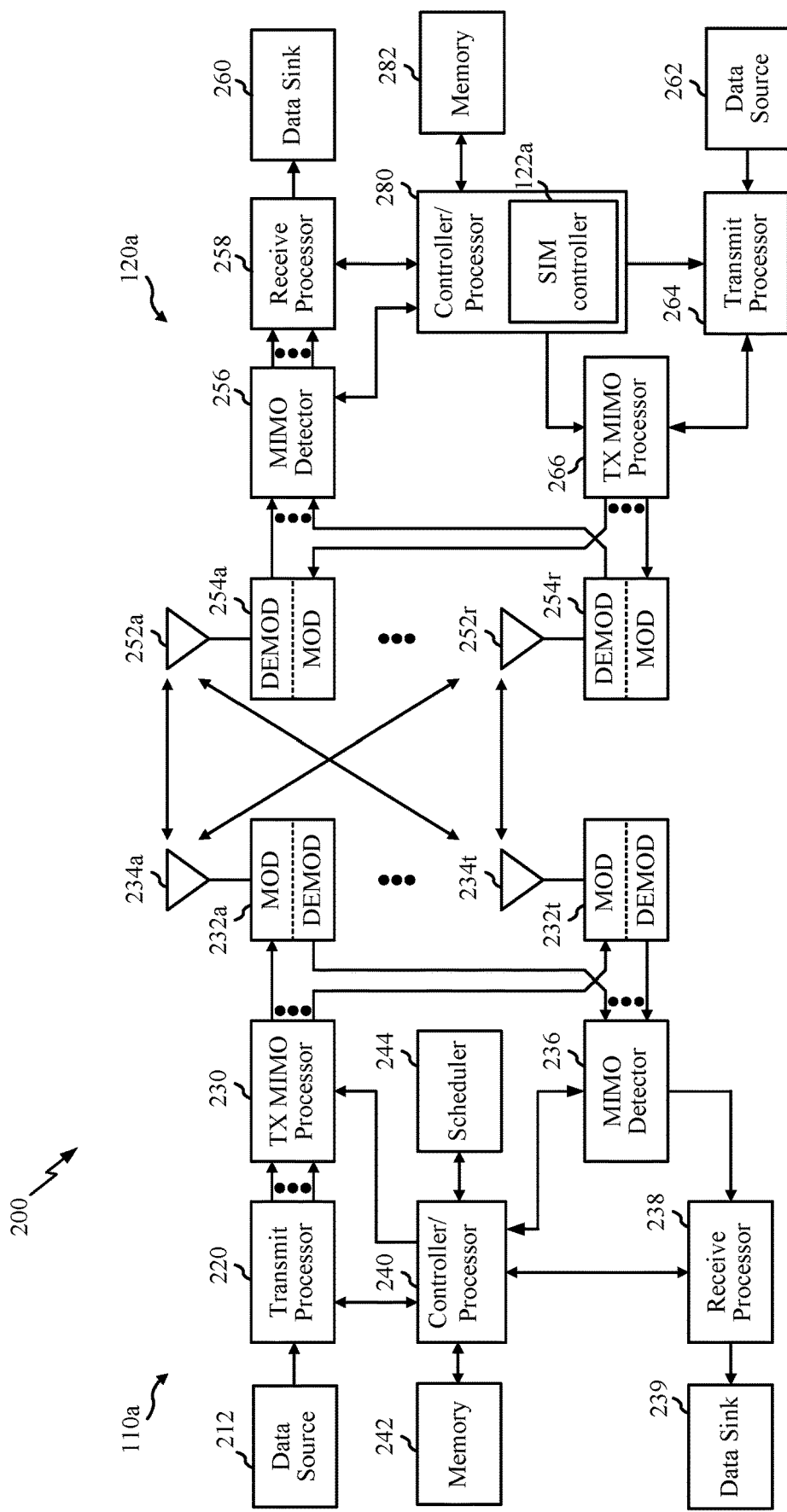
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 280 of the UE 120a has a SIM controller 122a, which is configured to implement one or more techniques described herein with reference to FIGS. 5-6.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback such as CSI related to a sidelink channel quality. In some systems (e.g., NR Release 16), a two stage SCI may be supported. Two stage SCI may include a first stage SCI (SCI-1) and a second stage SCI (e.g., SCI-2). SCI-1 may include resource reservation and allocation information, information that can be used to decode SCI-2, etc. SCI-2 may include information that can be used to decode data and to determine whether the UE is an intended recipient of the transmission. SCI-1 and/or SCI-2 may be transmitted over PSCCH.

NR concurrent radio-access technology (RAT) operation generally refers to operating multiple simultaneous active connections with at least one connection being on NR. For example, the two connections may involve LTE and NR connections, or both NR connections. Multi-SIM devices are able to connect to multiple networks independently without network awareness. Different UE behaviors may occur based on different implementations like dual-SIM dual active (DSDA) or dual-SIM dual standby (DSDS). DSDS generally refers to a dual-SIM deployment where the two SIM cards of the UE may be unable to simultaneously generate traffic. DSDA on the other hand refers to a dual-SIM deployment where both SIM cards of the UE may be active at the same time. As used herein, a SIM generally refers to both virtual and hardware implementations of a SIM. In other words, each SIM may be implemented using hardware (e.g., a physical SIM card) on the multi-SIM device, or implemented virtually using a remote database.

Dual SIM receivers allow the different SIMs to support a variety of different combination options. For example, dual-SIM (DSIM) devices could support the following:
SA-NR+SA-NR: both SIMs could support standalone (SA) NR (SA-NR);
NSA-NR+LTE: one SIM supports non-standalone (NSA) while another SIM supports LTE;
LTE+LTE: both SIMs support LTE;
LTE+W: one SIM supports LTE, the other supports wideband CDMA; or any other combination (X RAT+X RAT both SIMs the same RAT or X RAT+Y RAT the SIMs support different RATs).

Figure 3:
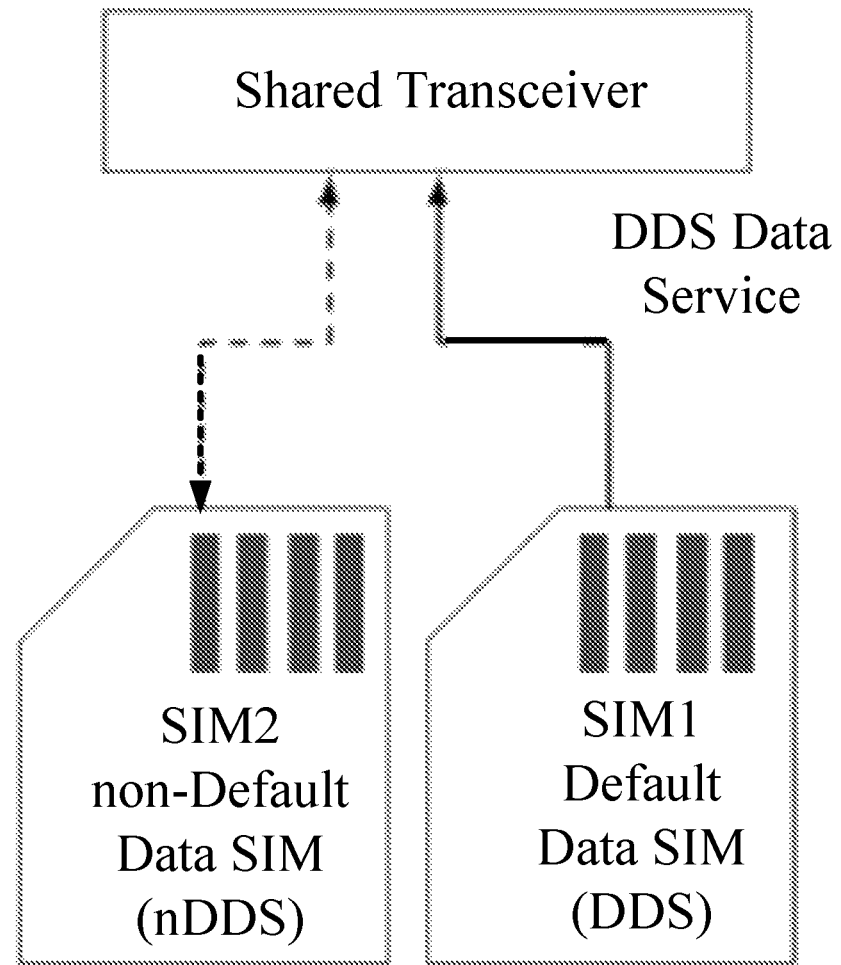
FIG. 3 illustrates an example multi-SIM deployment for a UE, in accordance with certain aspects of the present disclosure.

In some cases, in a multi-SIM deployment, each SIM of the UE can belong to the same network carrier. For example, two or more SIMs (also referred to herein as subscribers or SUBs) belonging to the same operator can be in the following modes:
(1) Idle+Idle: 2 or more SUBs in Idle camp to the same cell
(2) Connected+Idle: 1 SUB in Idle and 1 Sub Connected camp to the same cell FIG. 3 illustrates an example multi-SIM deployment, in which multiple SIMs share a single radio resource. For example, sharing the same radio resource, one SIM/subscriber module (SUB) may register with a 5G/NR radio access network (RAN), while another may register with LTE.

In such cases, two subscriber modules (SUBs) share the radio in the time domain, each accessing the shared radio resource at different times. Sharing a single radio resource by multiple SUBs may cause issues.

For example, as illustrated in FIG. 3, when one SUB, such as a data delivery SIM (DDS), is running time sensitive services, such as online gaming with high definition (HD) video and another SUB, such as a non-DDS (nDDS) needs to access the shared radio resource to monitor for paging.
Example Method to Improve Emergency Call In some cases, a UE may have issues making an emergency call in certain radio access networks (RANs). For example, in cases like IP Multimedia Core Network Subsystem (IMS), if an emergency call is not allowed by the network or voice over LTE (VOLTE) is disabled, a user interface (UI) may trigger a circuit switched (CS) only emergency call over the DDS SUB.

This scenario is typically referred to as falling back to the CS RAN. However, sometimes the CS fallback attempt may fail, which may cause capability in a packer service RAN (e.g., LTE) to be disabled over the DDS. In case the DDS was camped on LTE and had a secondary cell group (SCG) enabled in a non-standalone (NSA) NR scenario, this may result in loss of LTE and 5G NSA service.

Figure 4:
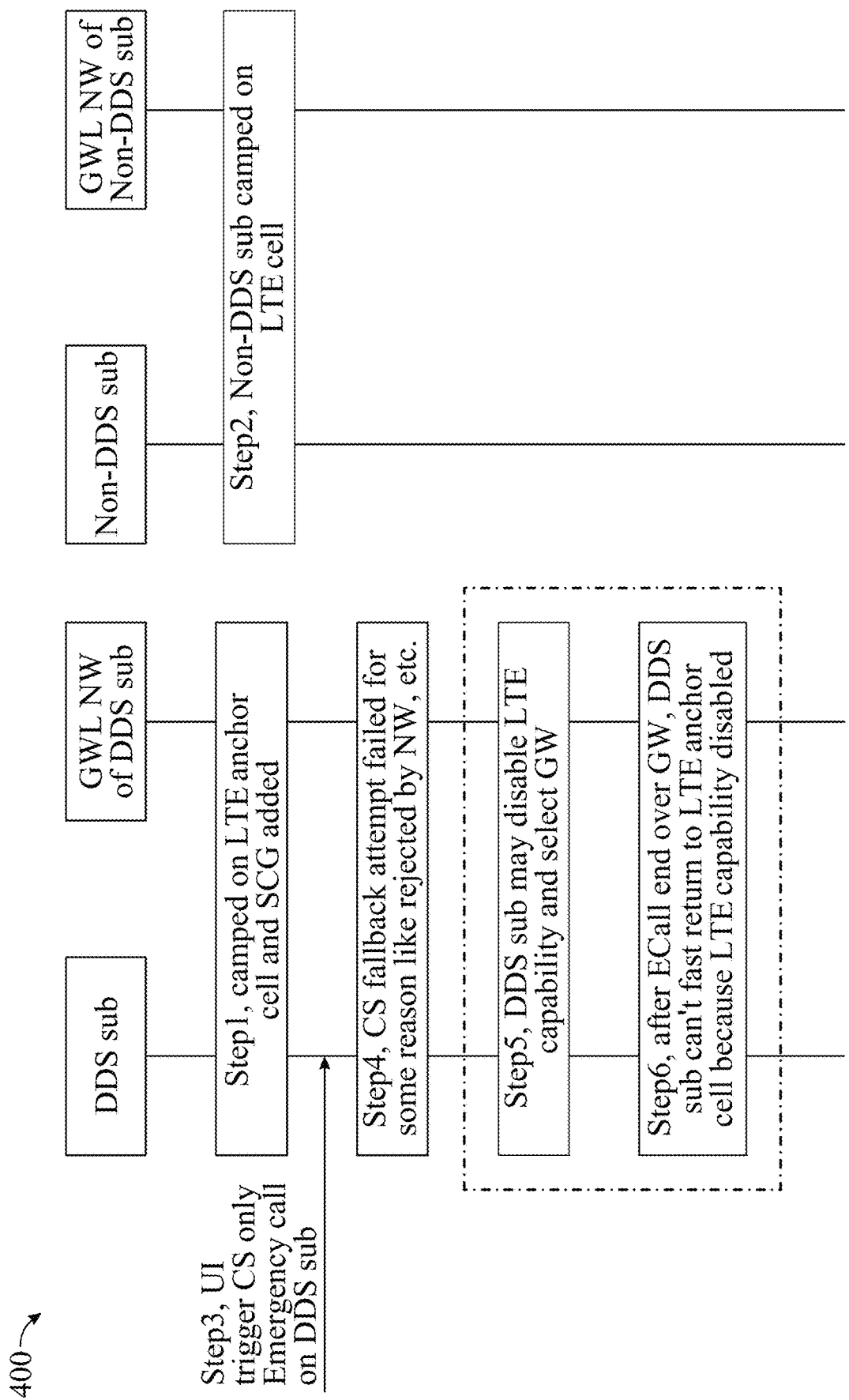
FIG. 4 is a call flow diagram illustrating an example emergency call scenario that may be improved using techniques presented herein.

The call flow diagram of FIG. 4 illustrates an example of this scenario. As illustrated, the UE, via the DDS SUB is camped on an LTE anchor cell with an SCG added for 5G NSA (step 1). The non-DDS is camped on LTE (step 2). The LTE cells may be part of a global system for mobile communications (GSM), wideband CDMA (W-CDMA), and LTE (GWL) network.

A UE triggers a CS only Emergency call on the DDS SUB (step 3). As illustrated, the CS fallback attempt fails (step 4) for some reason (e.g., a request is rejected by the NW).

As illustrated, in a conventional scenario, the DDS SUB may disable LTE capability (step 5) and select a CS cell (GSM or W-CDMA, collectively GW). Unfortunately, after the emergency call over GW has ended (step 6), the DDS SUB may not be able to return to the LTE anchor cell without significant delay, because the LTE capability was disabled (at step 5).

This conventional approach has disadvantages. For example, this conventional approach may cause the DDS SUB to lose LTE and 5G NSA service, adding latency when the UE returns after the emergency call. Further, this conventional approach may result in significant power consumption as the UE attempts to select a GW cell (at step 5).

Aspects of the present disclosure, however, may help address these issues by re-attempting an emergency call on the non-DDS SUB in the event that an attempt of the emergency call on the DDS SUB fails. This approach may avoid disabling RAN capability (e.g., LTE and/or NR) on the DDS SUB, which may allow for a quicker return to an LTE anchor cell and may avoid power consumption associated with attempting to select a GW cell for the emergency call.

Figure 5:
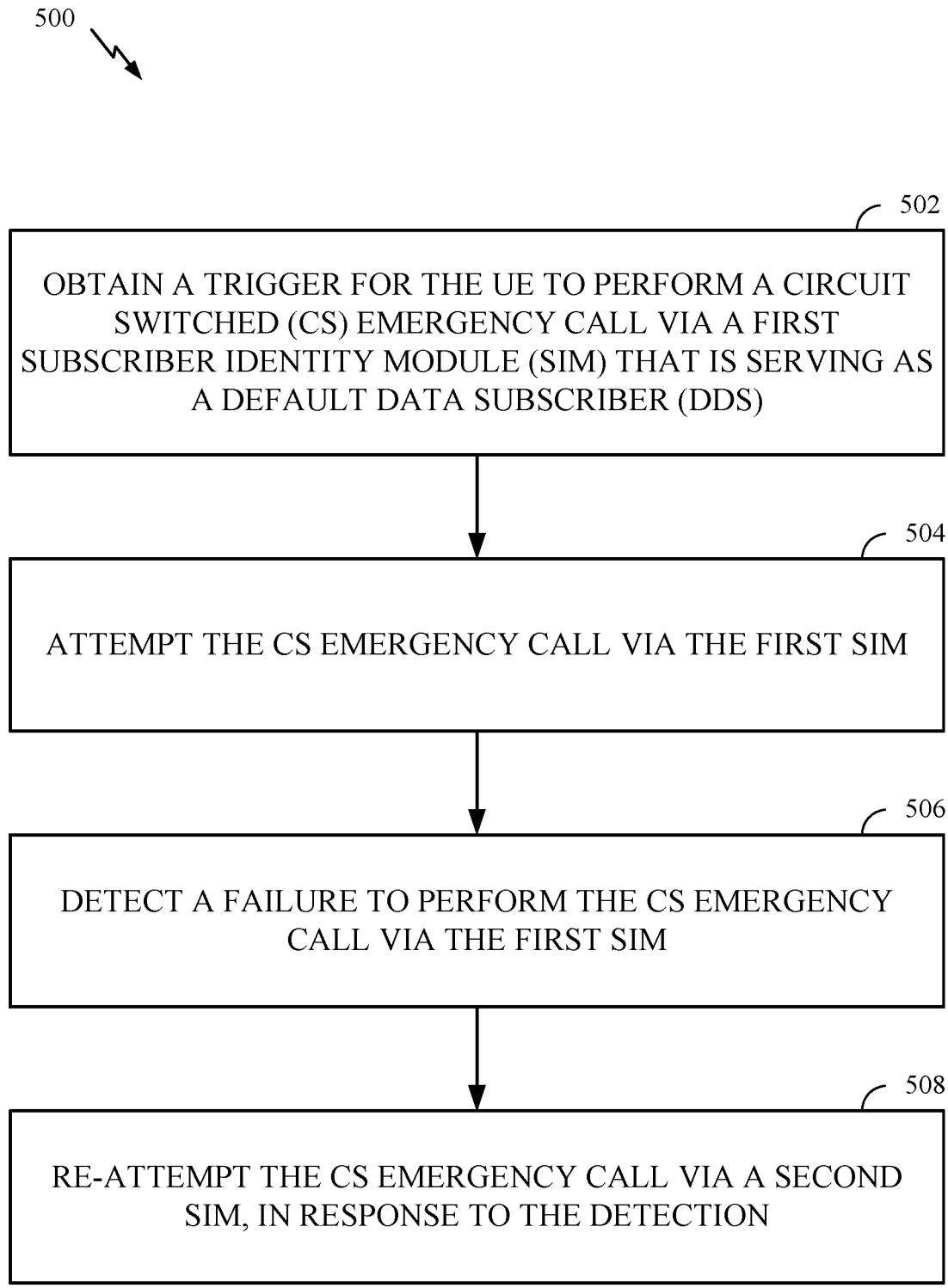
FIG. 5 illustrates example operations for wireless communication by a UE, in accordance with certain aspects of the present disclosure.

FIG. 5 illustrates example operations 500 for wireless communication, in accordance with certain aspects of the present disclosure. The operations 500 may be performed by a UE (e.g., UE 120a in the wireless communication network 100) equipped with multiple SIMs (e.g., corresponding to SUB1 and SUB2).

Operations 500 begin, at 502, by obtaining a trigger for the UE to perform a circuit switched (CS) emergency call via a first subscriber identity module (SIM) that is serving as a default data subscriber (DDS). At 504, the UE attempts the CS emergency call via the first SIM. At 506, the UE detects a failure to perform the CS emergency call via the first SIM. At 508, the UE re-attempts the CS emergency call via a second SIM, in response to the detection.

Figure 6:
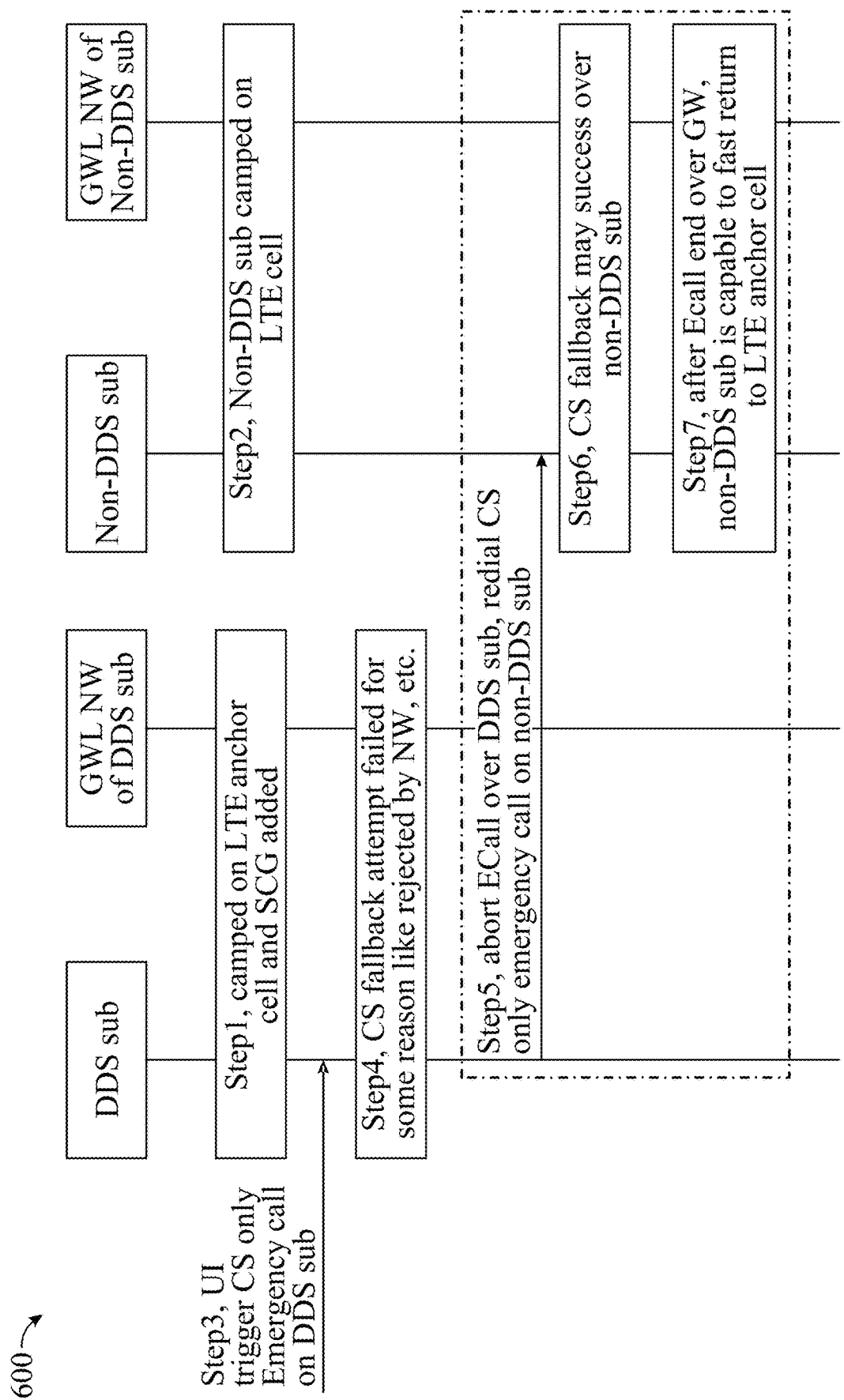
FIG. 6 is a call flow diagram for an emergency call, in accordance with certain aspects of the present disclosure.

Operations 500 may be understood with reference to call flow diagram shown in FIG. 6.

Like the example in FIG. 4, the example shown in FIG. 6 also assumes that the UE, via the DDS SUB is camped on an LTE anchor cell with an SCG added for 5G NSA (step 1) and that the non-DDS is camped on LTE (step 2).

Again, as with the example, in FIG. 4, a UE triggers a CS only Emergency call on the DDS SUB (step 3), but the CS fallback attempt fails (step 4) for some reason.

In the example shown in FIG. 6, however, after the failed CS fallback attempt, the UE aborts the emergency call over the DDS sub, and attempts to redial a CS only emergency call on non-DDS sub (at step 5).

As illustrated, (at step 6) the CS fallback may succeed over the non-DDS SUB (e.g., due to different network conditions on the cells the non-DDS SUB is camped on). After the emergency call has ended over GW, the non-DDS SUB may be capable of a fast return to the LTE anchor cell (step 7). In other words, the UE may be able to effectively maintain LTE and 5G NSA service in a relatively stable manner, because the DDS SUB does not disable LTE capability.

Potential benefits of the techniques described herein include avoiding disabling RAN capability (e.g., LTE and/or NR) on the DDS SUB, which may allow for a quicker return to an LTE anchor cell and may avoiding power consumption associated with attempting to select a GW cell for the emergency call.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations shown in FIG. 5.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for attempting, means for re-attempting, means for detecting, means for obtaining, means for camping, means for adding, means for performing, means for leaving and means for returning may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
    camping on:
        an anchor cell of a first radio access network (RAN) via a first subscriber identity module (SIM) that is serving as a default data subscriber (DDS); and
        another cell of the first RAN via a second SIM that is serving as a non-DDS;
    obtaining a trigger for the UE to perform a circuit switched (CS) emergency call via the first SIM;
    attempting the CS emergency call via the first SIM and a second RAN;
    detecting a failure to perform the CS emergency call via the first SIM and the second RAN; and
    in response to the detection, re-attempting the CS emergency call via the second SIM and the second RAN, without disabling RAN capabilities associated with the first SIM; and
    after completion of the CS emergency call, returning to the first RAN based on the re-attempting the CS emergency call via the second SIM and the second RAN without the disabling the RAN capabilities associated with the first SIM.

2. The method of claim 1, further comprising, when the trigger is received:
    adding a secondary cell group (SCG) of a third RAN via the first SIM.

3. The method of claim 2, wherein:
    the first RAN comprises a long term evolution (LTE) RAN; and
    the third RAN comprises a new radio (NR) RAN.

4. The method of claim 1, wherein re-attempting the CS emergency call via the second SIM and the second RAN comprises:
    performing a fallback procedure; and
    leaving the first RAN for the second RAN, wherein the second RAN comprises a CS RAN,
    re-attempting the CS emergency call after leaving the first RAN for the second RAN.

5. The method of claim 4, wherein the detecting of the failure to perform the CS emergency call via the first SIM and the second RAN comprises detecting a rejection, from the second RAN, of the attempt to perform the CS emergency call via the first SIM.

6. The method of claim 4, wherein the CS RAN comprises:
    a global system for mobile communication (GSM) RAN: or
    a wideband code division multiple access (W-CDMA) RAN.

7. An apparatus for wireless communications by a user equipment (UE), comprising:
    means for camping on:
        an anchor cell of a first radio access network (RAN) via a first subscriber identity module (SIM) that is serving as a default data subscriber (DDS); and
        another cell of the first RAN via a second SIM that is serving as a non-DDS;
    means for obtaining a trigger for the UE to perform a circuit switched (CS) emergency call via the first SIM that is serving as a default data subscriber (DDS);
    means for attempting the CS emergency call via the first SIM and a second RAN;
    mean for detecting a failure to perform the CS emergency call via the first SIM and the first RAN;
    in response to the detection, means for re-attempting the CS emergency call via the second SIM and the second RAN, without disabling RAN capabilities associated with the first SIM; and
    after completion of the CS emergency call, means for returning to the first RAN based on the re-attempting the CS emergency call via the second SIM and the second RAN without the disabling the RAN capabilities associated with the first SIM.

8. The apparatus of claim 7, further comprising, when the trigger is received:
    means for adding a secondary cell group (SCG) of a third RAN via the first SIM.

9. The apparatus of claim 8, wherein:
    the first RAN comprises a long term evolution (LTE) RAN; and
    the third RAN comprises a new radio (NR) RAN.

10. The apparatus of claim 7, wherein the means for re-attempting the CS emergency call via the second SIM and the second RAN comprises:
    means for performing a fallback procedure;
    means for leaving the first RAN for the second RAN, wherein the second RAN comprises a CS RAN; and
    means for re-attempting the CS emergency after leaving the first RAN for the second RAN.

11. The apparatus of claim 10, wherein the means for detecting the failure to perform the CS emergency call via the first SIM and the second RAN comprises means for detecting a rejection, from the second RAN, of the attempt to perform the CS emergency call via the first SIM.

12. The apparatus of claim 10, wherein the CS RAN comprises:
    a global system for mobile communication (GSM) RAN: or
    a wideband code division multiple access (W-CDMA) RAN.

13. An apparatus for wireless communications by a user equipment (UE), comprising:
    at least one memory comprising executable instructions; and
    one or more processors configured to execute the executable instructions to cause the apparatus to:
        camp on:
            an anchor cell of a first radio access network (RAN) via a first subscriber identity module (SIM) that is serving as a default data subscriber (DDS); and
            another cell of the first RAN via a second SIM that is serving as a non-DDS;
        obtain a trigger for the UE to perform a circuit switched (CS) emergency call via the first SIM; and
    a processing system configured to:
        attempt the CS emergency call via the first SIM and a second RAN;
        detect a failure to perform the CS emergency call via the first SIM and the second RAN; and
        in response to the detection, re-attempt the CS emergency call via the second SIM and the second RAN, without disabling RAN capabilities associated with the first SIM; and after completion of the CS emergency call, return to the first RAN based on the re-attempting the CS emergency call via the second SIM and the second RAN without the disabling the RAN capabilities associated with the first SIM.

14. The apparatus of claim 13, wherein the processing system is further configured to, when the trigger is received: add a secondary cell group (SCG) of a third RAN via the first SIM.

15. The apparatus of claim 14, wherein:
the first RAN comprises a long term evolution (LTE) RAN; and
the third RAN comprises a new radio (NR) RAN.

16. The apparatus of claim 13, wherein, to re-attempt of the CS emergency call via the second SIM and the second RAN, the one or more processors are configured to cause the apparatus to:
perform a fallback procedure;
leave the first RAN for the second RAN, wherein the second RAN comprises a CS RAN; and
re-attempt the CS emergency call after leaving the first RAN for the second RAN.

17. The apparatus of claim 16, wherein, to detect the failure to perform the CS emergency call via the first SIM and the second RAN, the one or more processors are configured to cause the apparatus to detect, from the second RAN, of the attempt to perform the CS emergency call via the first SIM.

18. The apparatus of claim 16, wherein the CS RAN comprises:
a global system for mobile communication (GSM) RAN: or
a wideband code division multiple access (W-CDMA) RAN.

19. A user equipment (UE), comprising:
a receiver configured to receive a trigger for the UE to perform a circuit switched (CS) emergency call via a first subscriber identity module (SIM) that is serving as a default data subscriber (DDS); and
at least one memory comprising executable instructions; and
one or more processors configured to execute the executable instructions to cause the UE to:
camp on:
an anchor cell of a first radio access network (RAN) via a first SIM; and
another cell of the first RAN via a second SIM that is serving as a non-DDS;
attempt the CS emergency call via the first SIM and a second RAN;
detect a failure to perform the CS emergency call via the first SIM and the second RAN, and
in response to the detection, re-attempt the CS emergency call via the second SIM and the second RAN, without disabling RAN capabilities associated with the first SIM; and
after completion of the CS emergency call, return to the first RAN based on the re-attempting the CS emergency call via the second SIM and the second RAN without the disabling the RAN capabilities associated with the first SIM.

20. A non-transitory computer-readable medium for wireless communications by a user equipment (UE), comprising:
instructions that, when executed by one or more processors of the UE, cause the UE to:
camp on:
an anchor cell of a first radio access network (RAN) via a first subscriber identity module (SIM) that is serving as a default data subscriber (DDS); and
another cell of the first RAN via a second SIM that is serving as a non-DDS;
obtain a trigger for the UE to perform a circuit switched (CS) emergency call via the first SIM;
attempt the CS emergency call via the first SIM and a second RAN;
detect a failure to perform the CS emergency call via the first SIM and the second RAN; and
in response to the detection, re-attempt the CS emergency call via the second SIM and the second RAN, without disabling RAN capabilities associated with the first SIM; and
after completion of the CS emergency call, return to the first RAN based on the re-attempting the CS emergency call via the second SIM and the second RAN without the disabling the RAN capabilities associated with the first SIM.

* * * * *